July 31, 1945.   E. A. THOMPSON   2,380,680
CLUTCH AND CONTROL
Original Filed Feb. 14, 1940   7 Sheets-Sheet 4
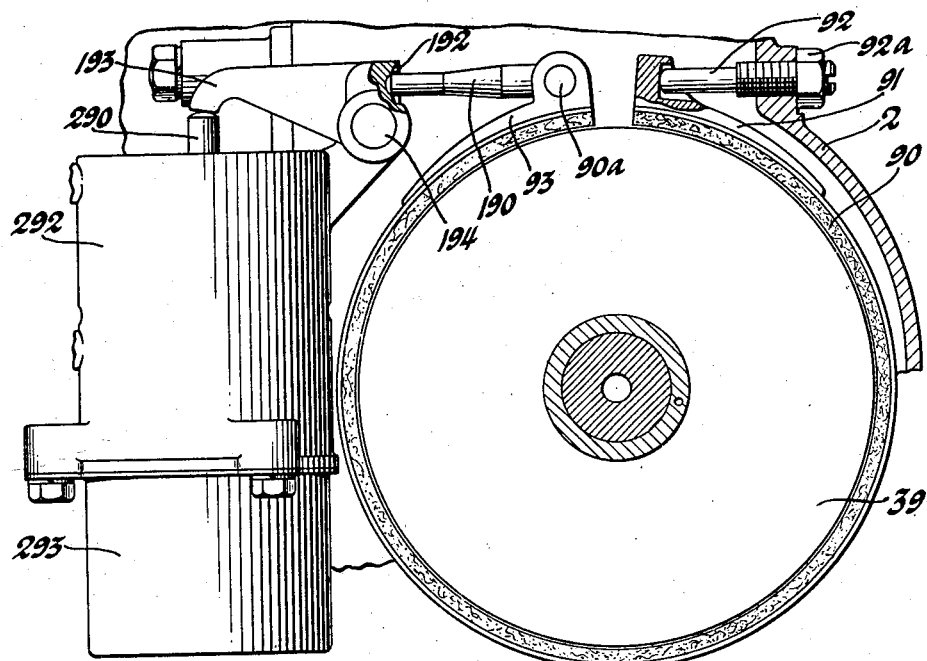
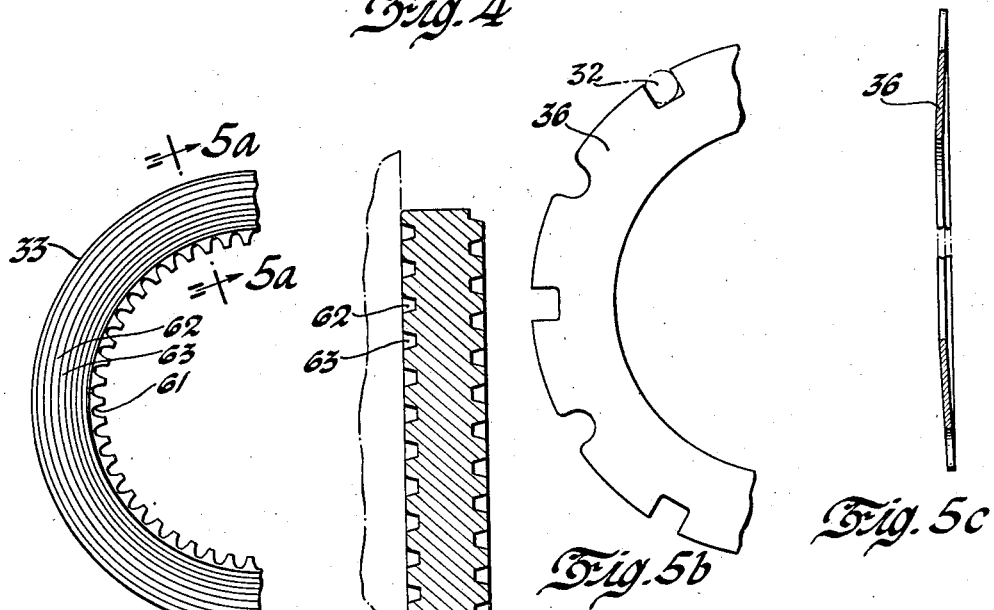
INVENTOR:
EARL A. THOMPSON
BY: Blackmore, Spencer & Flint
ATTORNEYS

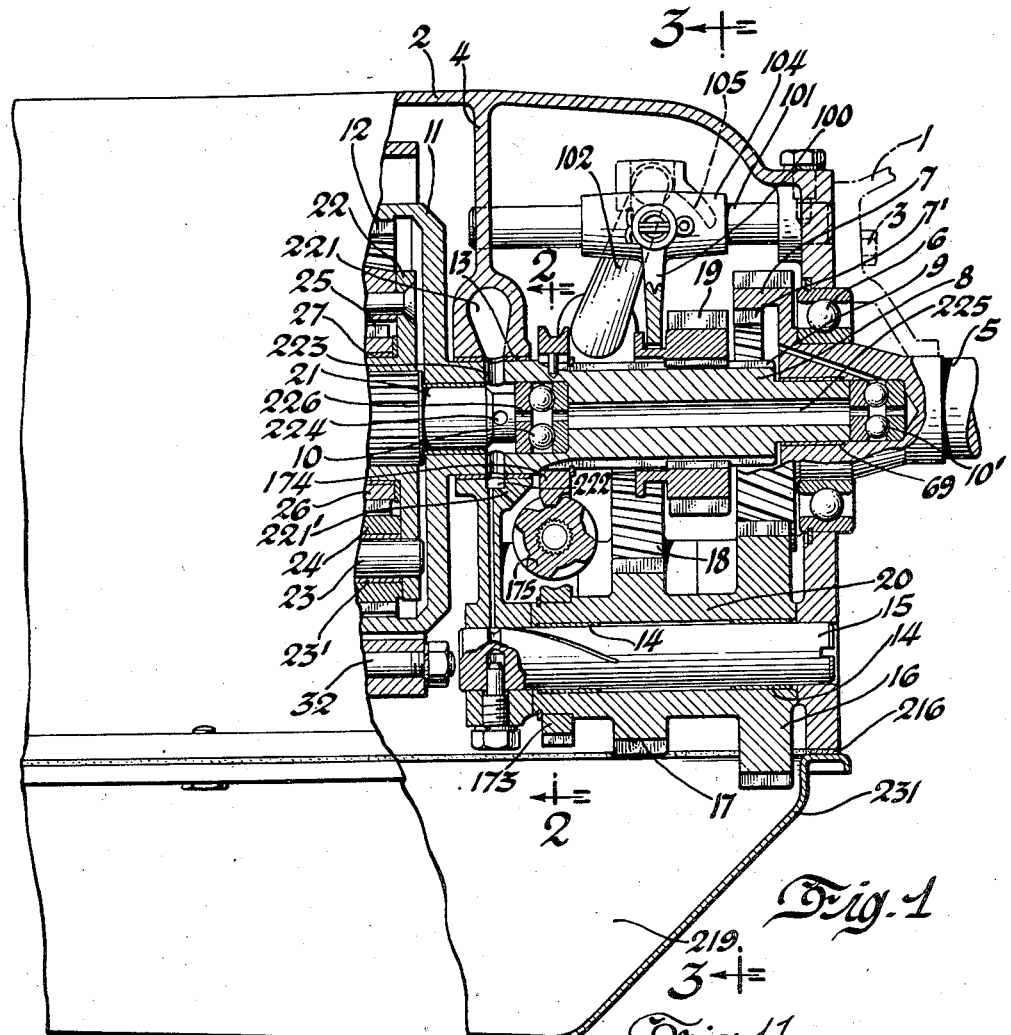
Fig. 1
Fig. 1b
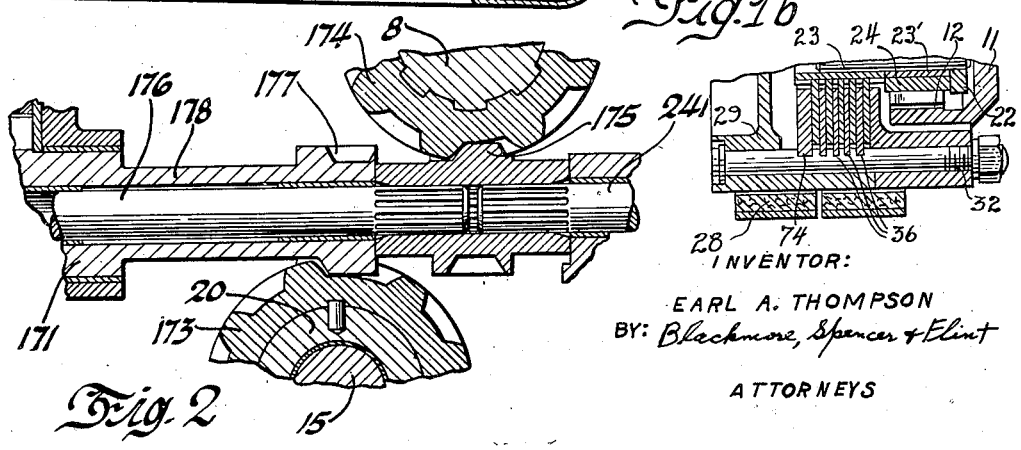
Fig. 2
INVENTOR:
EARL A. THOMPSON
BY: Blackmore, Spencer & Flint
ATTORNEYS

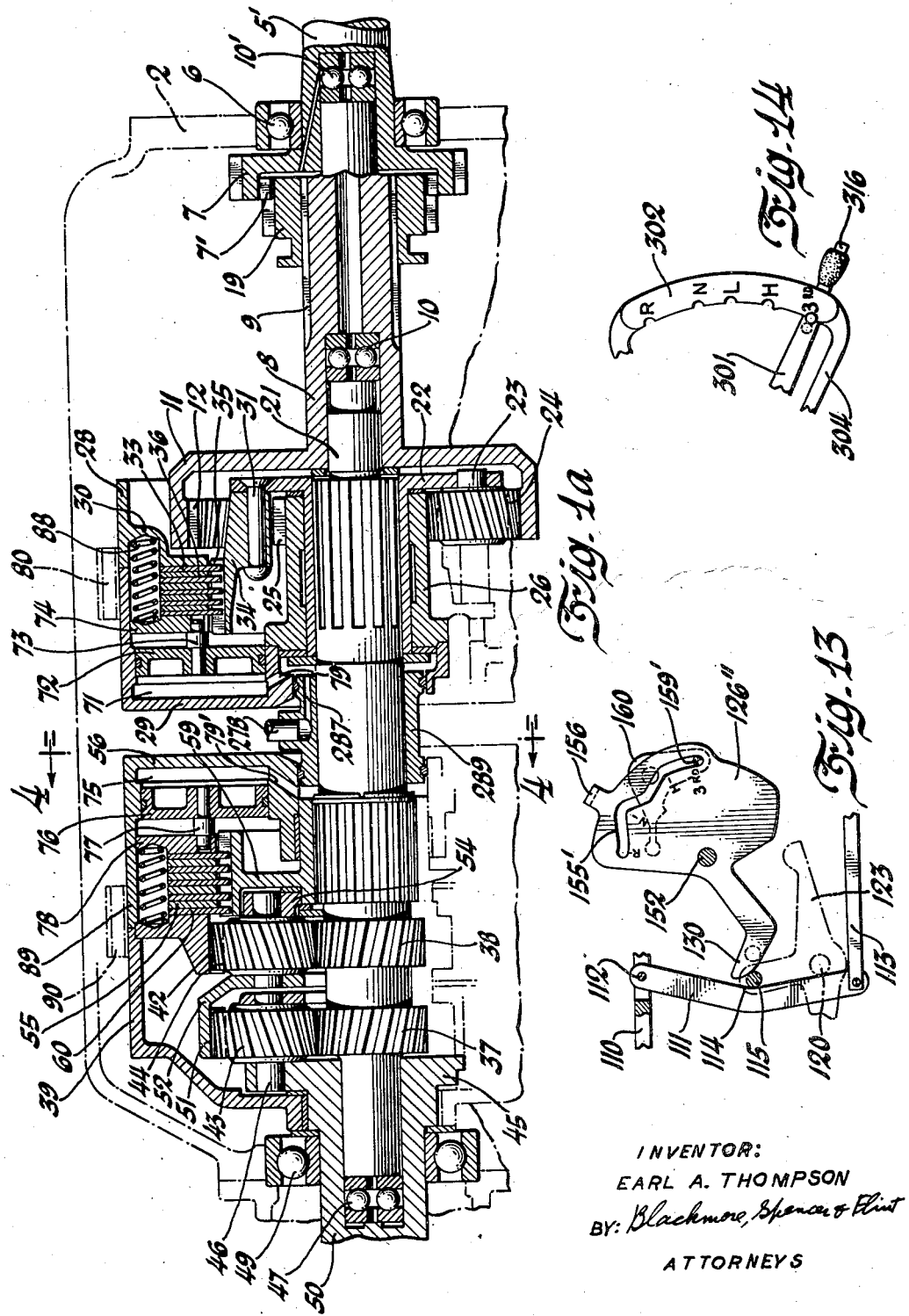

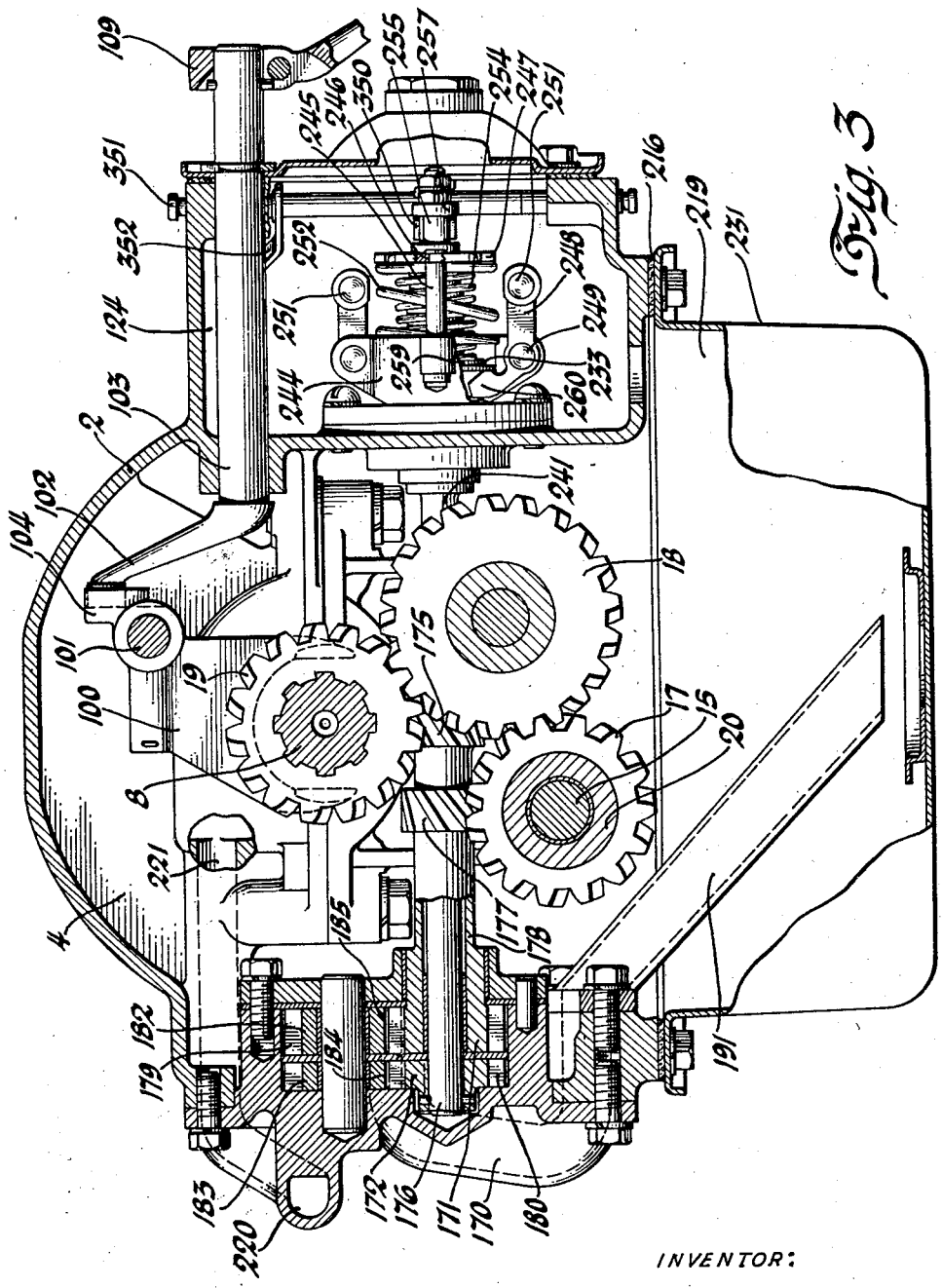

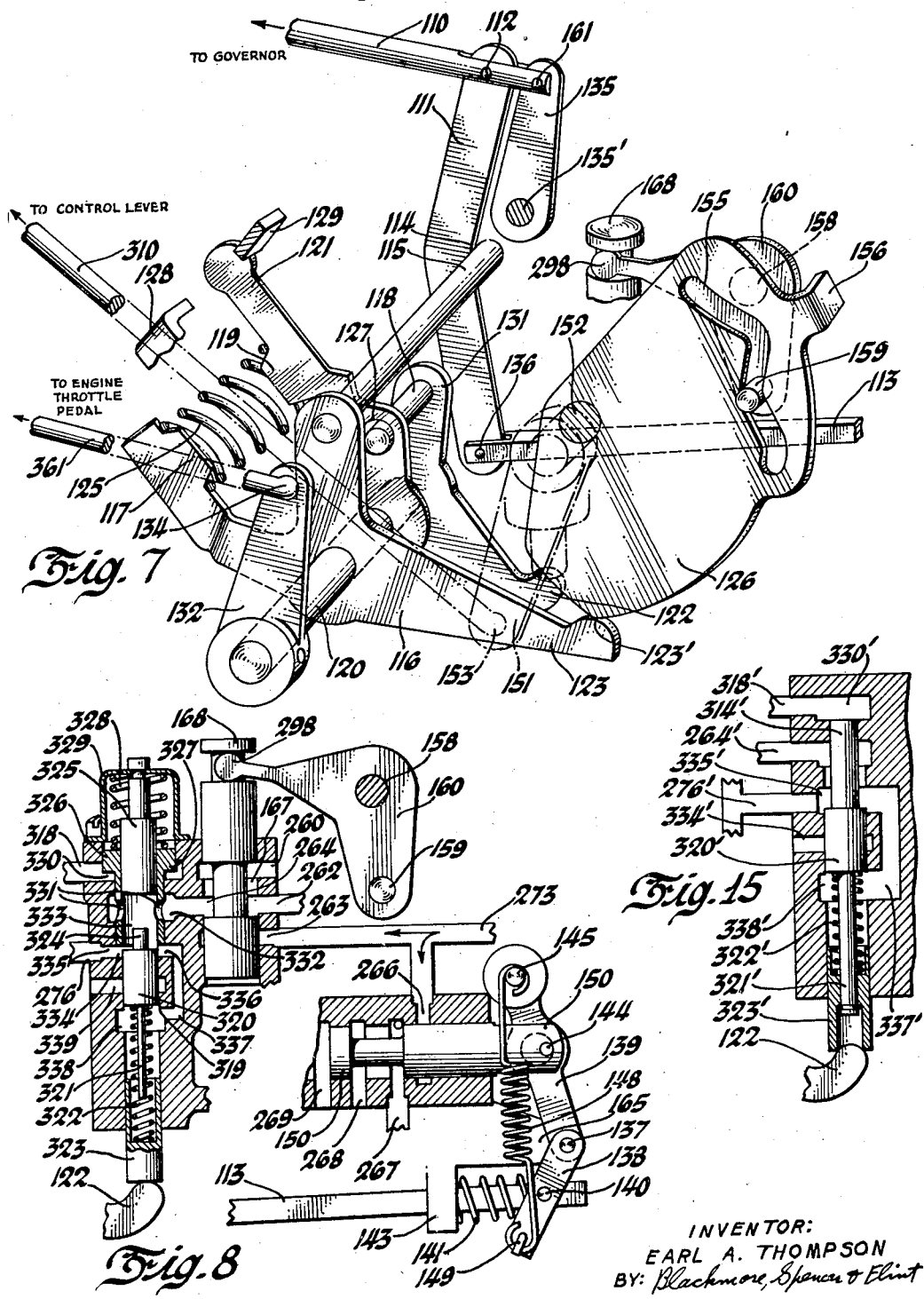

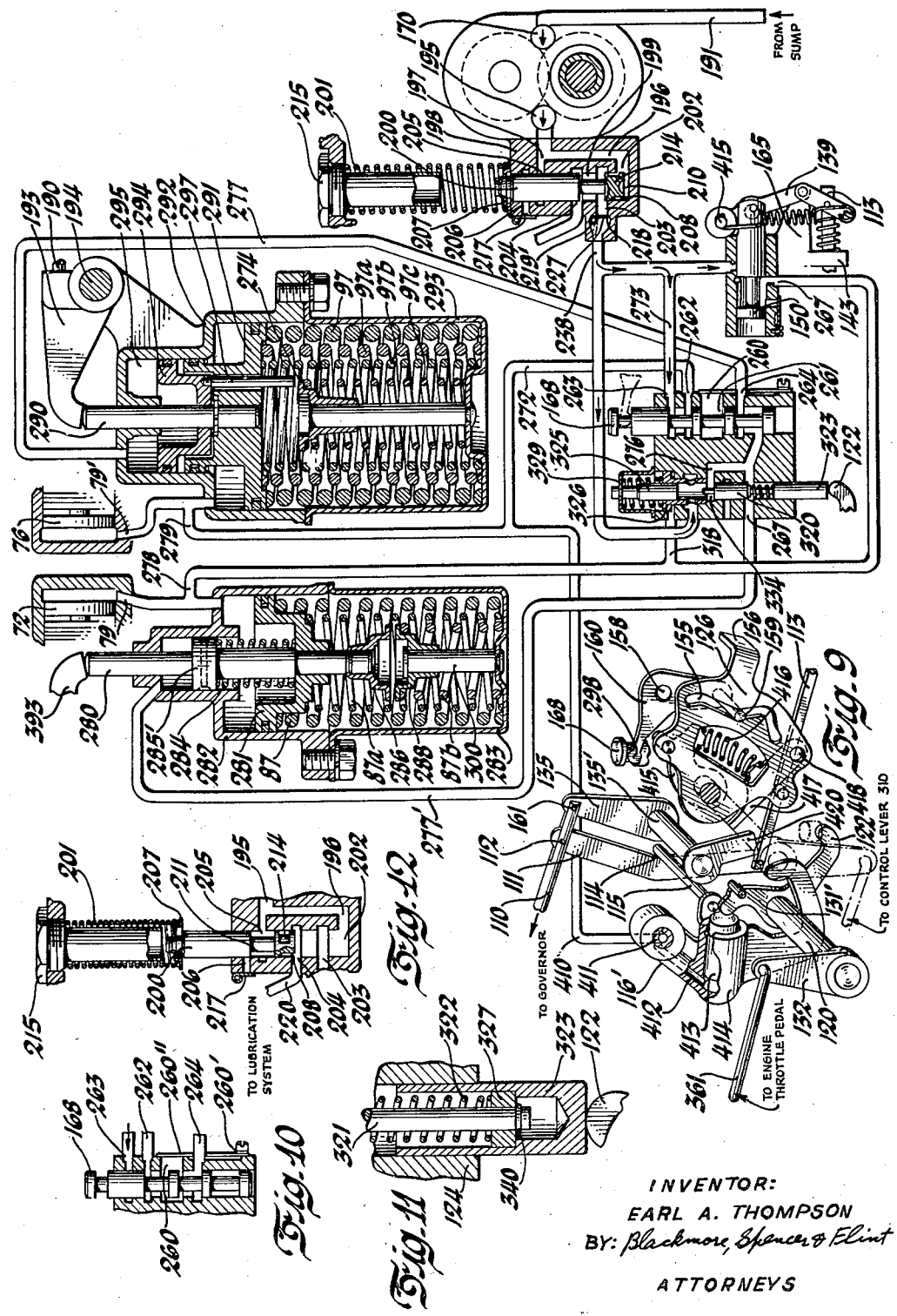

Patented July 31, 1945

2,380,680

UNITED STATES PATENT OFFICE 2,380,680
CLUTCH AND CONTROL

Earl A. Thompson, Bloomfield Hills, Mich., assignor to General Motors Corporation, Detroit, Mich., a corporation of Delaware Application February 14, 1940, Serial No. 318,945, which is a division of application Serial No. 130,956, March 15, 1937. Divided and this application June 29, 1942, Serial No. 448,939

9 Claims. (Cl. 192—69)

The invention of the present application is related to and associated with my prior U. S. Serial Number 659,752, filed March 8, 1933, to U. S. Serial Number 747,386, filed October 8, 1934, and issued April 2, 1940, as Patent Number 2,195,605, and to my U. S. Serial Number 45,184, filed October 16, 1935, and issued March 12, 1940, as Patent Number 2,193,304. The present application is a divisional of my application for Letters Patent Serial No. 318,945, filed February 14, 1940, which is a division of my application Serial Number 130,956, filed March 15, 1937. In the first of these I show an automatically controlled gearing unit combined with a standard gearshift, providing automatic changes over a range of hand selected speed ratios.

In the second application noted above are shown improvements providing smoothness of shift from one ratio to another, and a degree of master control by operator-operable members, yielding a high degree of safety in practical use.

In the third application I show further improvements which provide added safety features for operator domination over the normally automatically shifted ratio regime, useful during a wider range of operating conditions than in the preceding disclosures.

A major improvement in the present divisional application is the operator-operated means by which I obtain not only a controlled clutch rate control, but also provide additional compensated rate control in one unit according to the ratio in which the other unit is driving. This feature adds smoothness to the overall operation not believed available in prior art mechanisms of this character.

Further improvements in servo means so arranged as to tend toward non-failure is shown in my double pump drive, described further in detail but not claimed as invention herein.

An additional feature of value is the means whereby the oil draining from the direct coupling clutch plates is accomplished during engagement, and the further means by which the oil film therein is broken at disengagement, with a minimum of drag effect which otherwise would cause excessive wear.

Of outstanding novelty is the means whereby I obtain automatic ratio shift by clutch and brake operation in both forward driving units of my assembly by sequentially combining the pressure rise characteristics of the servo pump with the further characteristics of governor and operator-operable accelerator pedal position, wherein a full range of forward driving speed ratios is made available, depending upon the settings of the manual control means, other than the aforesaid pedal.

As I have demonstrated, controls for transmission units connected in multiple series between the power and the load for obtaining a full range of transmission ratios require a regime wherein during a cyclic shift from lowest ratio to highest ratio or vice versa, it is necessary to execute a simultaneous or nearly simultaneous shift in multiple units. An example of this is in seriatim two-speed gearing designed to provide four forward speeds, as described in my S. N. 45,184 in particular. In such an assembly, "first" will be low gear in both units; "second" will be through low in one unit with the other in direct drive; "third" will be by direct drive in the first unit, with low in the second. "High" will be direct drive in both units. In my present application I demonstrate a form of shift control wherein predetermined sequence of alternate change of the brakes and clutches in the two forward driving units yields a full range of ratios under given driving circumstances.

For a shift from "second" to "third," for example, a change in both units is required. The alternatives of opening the torque path in one unit, making the shift in the second unit during the no-drive or low torque period of the first, and completion of shift in the first unit; or else making the effort to establish a nearly simultaneous shift in both units are herewith demonstrated. The complications of sequence controls so as to avoid jerks and uneven and overdwelling shift intervals are also troublesome from the point of view of mechanical adjustment and retention of desired shift sequences.

In the present arrangement of my invention nearly simultaneous but practically sequential shift operation in both forward driving units is achieved, for advantages in a measured change speed interval, quickly established and completed. Inertia absorption means are also shown to provide speed change interval under torque for quietness and shockless transfer to a new driving condition.

As has been discussed in my preceding cases, automatically operable or "self-changing" gearing consist of two ordinary types; first, wherein the no-drive interval of shift is established by opening of a main clutch; and second, wherein the main clutch need not be manipulated, the elements within the transmission providing all of the essentials for the no-drive or low torque interval. My invention discloses the latter as an example, however, with improvements in simplicity over the first noted, and a resulting economy in the number of parts.

In the preferred construction of S. N. 45,184 noted preceding now matured as U. S. 2,193,304, the invention is shown embodied in a form of change speed gear unit which is utilized by itself as a ratio changer between a prime mover, clutch and a load to be driven; or else included in a grouped assembly of change speed devices operating between a power and a load shaft. While the example showing is in the form of epicyclic gearings having alternate torque paths, one being a direct drive, others through gearing of planetary form, the friction elements used to connect direct drive and to set up drive through gearing, may equally be used to connect parallel clutches in common four-speed constant mesh gearboxes, within the purview of my invention.

A feature of my invention is the simplified manner of automatic control having overriding master control means to set aside automatic selection and compel shift of drive by the brakes and clutches to a desired driving ratio, through measured torque capacity proportioned to torque demand.

The interconnection of my controls with the priorly described controls of associated prime movers and variable speed transmission and clutch units is likewise herewith disclosed and augmented for a compounded power control regime yielding correlated functional speed ratio changes wherein doubly-compounded speed ratio changing effects are obtained by mechanism providing graduated rate-of-change action.

Additional features of novelty appear in my disclosure as regards auxiliary power supply, alternate measured actuation of selected speed ratio compelling and actuating mechanism, reciprocal and coordinate automatic controls therefor, involving combinations of driver will, driving conditions, and master selection controls capable of superseding automatically selected speed ratio settings. These features involve the use of mechanism providing a proportional torque capacity measured according to torque demand, and will be apparent upon inspection of the following specifications, claimed and illustrated in the accompanying drawings, in which:

Figure 1 is an elevation section of the forward-neutral-reverse gear showing the drive to the servo pump system, the lubrication porting and the shifter mechanism for the primary shift gearing controls.

Figure 1a is a similar view to Figure 1 of the general transmission assembly structure with the casing broken away at the bottom.

Fig. 1b is a broken away section of the drive elements located at the lower left portion of Fig. 1.

Figure 2 shows a vertical cross section of the double drive to the servo pump system taken at 2—2 of Figure 1.

Figure 3 is a vertical cross section taken at 3—3 of Figure 1 showing the special relations of the gearshaft centers of Figure 1; the double servo pump and drive, and the speed governor and drive for the automatic ratio shifting system.

Figure 4 shows an elevation cross section at 4—4 of Figure 1a, in which the geared drive actuation system of the rear unit is described.

Figure 6:
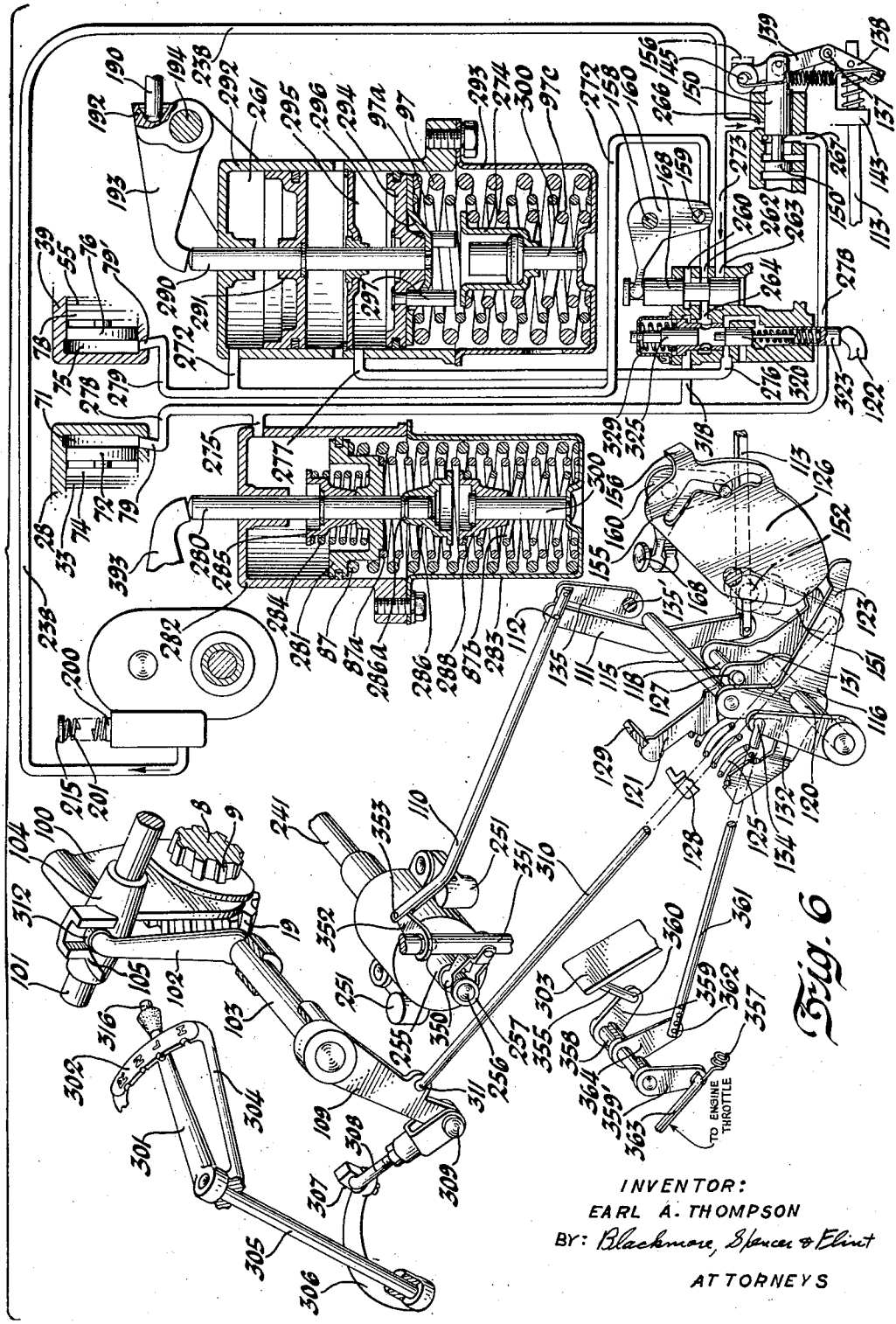

Figures 5 and 5a, 5b and 5c, describe the clutch plates 33—60 and 36—55 of the front and rear units of Figure 1a, which provide direct drive coupling. Figure 5a is a section of the externally keyed clutch plates 36 and 55, such as shown in section in Figure 1a.

Figure 6 is a schematic drawing of the entire control and shift actuation system as seen generally from the left side of the vehicle in which my installation is shown as an example. This view traces out all of the control functions both manual and automatic which include the action of the clutch device noted above; Figures 7 and 8 being enlarged views of the interlocking control lever system and the valving for the front and rear units respectively.

Figure 9 is of a schematic control system similar to Figure 6 embodying modifications of the controls and actuation members wherein a closer coupled integration over the degree of drive is maintained by the manual control elements, than in the system of Figure 6.

Figure 10 is a detailed sectional view of the manually operated control valve for the rear unit of Figure 9.

Figure 11 shows the differential valve of Figure 9 in detail.

Figure 12 is a view of the porting of the automatic pressure valve 200 of Figure 9, as in running condition.

Figure 13 is a view similar to those of Figures 6 and 7 of the interlocking lever controls, but describing modifications by which the operator may enforce continuous drive in third speed within a predetermined speed range. Figure 14 describes the modifications in the controls at the driver's position for the modifications of Figure 13.

Figure 15 is a representation of a modification of the differential control valve of Figures 6, 9 and 11, wherein the relative pressure operated sleeve is omitted, and the movable valve is a unitary member.

In Fig. 1 the vertical longitudinal section of the transmission structure shows the general relationships of the gearing and driving elements, with the forward-neutral-reverse gear unit at the right.

The main clutch bell housing 1 is attached to the transmission casing 2 by bolts 3. Web 4 separates the forward-reverse unit from the rest of the transmission, which is substantially as in S. N. 45,184 noted preceding, and shown also in section in Figure 1a.

The main clutch driven shaft 5 is supported in the casing 2 by ball bearing 6, and input gear 7 is fixed non-rotatably thereto. The splined shaft 8 of the forward-reverse unit pilots the forward end of shaft 21, where thrust bearings 10 and 10' deliver certain axial thrusts originating in the system of gearing and shafting to the casing 2 through bearing 6. Thrust bearing 10' is in the pilot space between shafts 5 and 8.

Driven shaft 9 carries drum 11, the inner surface of which is internally toothed at 12 to form the input ring gear of the "front" unit. Bearing 13 in web 4 supports shaft 9 in the casing 2.

The countershaft 15 is non-rotatably supported in casing 2 and web 4. The countershaft gear body 20 rotates on bearings 14 on the countershaft 15. The first gear element 16 of the countershaft gear body 20 constantly meshes with input gear 7.

The second countershaft gear element 17 is constantly meshed with reverse idler 18 supported in casing 2. The reverse idler gear 18 may also be meshed with sliding gear 19 splined to and slidable on splines 9 of shaft 8. The teeth of 19 are meshable with teeth 7' of gear 7.

Bushing 69 pilots shaft 8 in shaft 5 and integral gear 7.

Thrust bearing 47, similar to 10 and 10' transfers thrusts between shaft 21 and shaft 50 carried in the casing on bearing 49. The extension 45 of shaft 50 acts as a carrier for planets 43 spindled on shafts 46, as shown in Figure 1a.

The transmission lubrication and servo pump rotors 171 and 172 of the compound pump assembly to be described later, are driven, one by countershaft gearbody 20, the other by shaft 8. The compound pump operates constantly, whenever rotational power is applied to clutch driven shaft 5, or to shaft 8, by virtue of gears 173 and 174, rotating with the shafts respectively.

Shaft 21 is splined to carrier 22 of the front unit, and is piloted at the front end in shaft 8, and at the rear in the output shaft (not shown). Ported oil passages deliver servo and lubrication oil pressure to the various units as has been described. Shaft 21 is the power output member for the front unit. The rear unit is not shown in Figure 1.

Fixed to carrier 22 are spindle shafts 23 for planet pinions 24. Pinions 24 constantly mesh with the inner toothed ring 12 of drum 11, and with sun gear 25. The latter is integral with sleeve 26 rotating on bearings 27 of the sleeve of carrier 22. Pinions 24 rotate on bearings 23' on shafts 23.

Governor drive parts are shown in Figure 3 in relation to the gearing of Figure 1.

In the "rear unit" the arrangement of elements is as shown in S. N. 45,184, except as noted in the improvements in the present case. The elevation section of Figure 1a is a schematic view of the transmission structure according to the case noted.

In Figure 1a, the unitary assembly in section is given, with the identifying parts of Figure 1 in the forward-neutral reverse unit duplicated. The so-called front unit is that one immediately adjacent the forward-neutral-reverse gear, and consists of a planetary, two-speed gear, brake-clutch operated, the brake applied by springs regulated by outflow of fluid pressure, and the clutch applied by fluid pressure.

Bolt 32 in Figure 1 is a clamping means for the members 29 and 30 of the reaction drum of the front unit as shown in Figure 1a. The web of reaction sleeve 22 is riveted at 31 to hub 34 splined at 35 for plates 33. Plates 36 are apertured to permit passage of the bolts, as in Figure 5b.

The structure is; output shaft 21, keyed or splined to carrier 22 extended to support clutch plates 33, having spindles 23 for planets 24, reaction sun gear 25 being affixed by sleeve 26 to brake drum 28 extended at 30, and serving as a mount for presser plate 74, clutch releasing springs 88 and plates 36. The drum 28 is recessed in cylinders 71 for pistons 72 having pins 73, passage 79 opening to the cylinders from gland 289 to which pipe 278 leads by passage 287.

Shaft 21 is the input member for the so-called rear unit, and has integral sun gears 37 and 38 meshing with planets 43—44 respectively. Output shaft 50 is integral with carrier 45 of planets 43; and annulus 51 which constantly meshes internally with planets 43 is joined by drum 52 to carrier 54 for planets 44 which constantly mesh with annulus 42 rotating with drum 39 on which brake 90 may bear.

Fig. 1b is a partial section of the drive elements as viewed in more detail to the left of Fig. 1 and includes the drum and clutch plate mounting construction below the central portion of Fig. 1a. The clutch plates 36 are square notched as shown in Fig. 5b for the keying with studs 32, and presser plate 74 is likewise. The alternate rounded notches are to permit free space for disengaging springs 88, shown in Fig. 1a. Movement of plate 74 to the right compresses springs 88 and progressively flattens plates 36, the spaces between 36 and plates 33 closing radially with increased engaging motion while the plate contact area grows, the action building up the clutch torque capacity.

Clutch drum 59 is keyed to rotate with shaft 21, and is splined for clutch plates 60. Springs 89 are release biasing means for clutch 55—60, the plates 55 being keyed to rotate with drum 39, extended at 56, in which portion clutch cylinders 75 mount pistons 76, piston pins 77 bearing against presser plate 78. Passage 79' feeds from leads in gland member similarly to the front unit porting, for clutch actuation by fluid pressure. The operational action of clutch 55—60 is the same as that of clutch 33—36.

The brakes 80—90 are similar in construction, self-wrapping being negligible, the arrangement being as in Figure 4. The clutch plates are so designed that a definite amount of lubricant is maintained on the engaging driving faces after preliminary engagement. In Figure 5, the internally splined plate is shown spirally scored in a manner such that under pressure, excess lubricating oil squirts out at the periphery, yet a considerable volume of trapped oil remains in the score cuts, as will be clear by inspection of Figure 5a. In the Figure 1a, plates 33 and 60 are so constructed, and these are preferably of hardened bronze or similar material. The scores may intersect the external margin, or the internal spline cuts; or stop short of intersection at both points. The designer's requirement for effective clutch area, for the needed clutch capacity, the net coefficient of friction and for the time factor with respect to clutch capacity will control the choice of such intersection, the dimensions of the scores likewise being involved in both net clutch area and in the volume of oil desired to be held. Figure 5b shows the detail of clutch plates 36 and 55, externally keyed to rotate with drums 28 and 39 respectively. These are preferably of steel, and preformed in conical shape, in order to assist release when fluid pressure is removed for disengagement. It has been found in practice that multiple disc clutches under pressure have an unpleasant drag unless sufficient energy is stored in the clutch plates to break the compressed oil film through progressive shear force such as afforded by this construction. This method of release control is believed novel.

The action of engagement in a clutch such as at 33—36 is first for fluid pressure to flow in 278 and 79, Figure 1a, to move piston 72 against the conoidal disc spring action of clutch plates and releasing springs 88. As will be described later, the servo pumps of given speed-range capacity work against a resistance afforded by the brake springs 97—97a in addition to the above noted clutch spring actions, which determine the regulated ability of the clutch as a torque supporting mechanism.

As described thus far, the clutch will of necessity need to carry engine torque times a design factor, and the fluid pressure range needed to furnish direct driving torque with depend upon the servo pump net speed component. Later will be explained the means whereby the clutch capacity may be varied by changes in the torque demand and variations in ratio, yielding accommodation to driving conditions for smooth operation in which the net line pressure in cylinders 71, for example, may be low for initial drive when the clutch torque capacity requirements are low, and higher when the requirements are higher. From these initial points, the building up of clutch pressure to maximum engagement pressure proceeds on a predetermined scale commensurate with the available line pressure, conditioned by the resistances acting against the pumps.

In Figure 5 scores 62, 63 in plate 33 are spirally cut in sections as shown in Figure 5a, wherein a predetermined ratio of contact surface between the clutch plates, and the volume of oil which can be retained in the scores, is established. In the example, the innermost land of the scores does not intersect the internal teeth 61, but the outermost land does intersect the outer edge. The scores may serve as a flat reservoir of oil, when the clutch system 33—36 is engaged. Bolt 32 is a clamp bolt for the drum parts, and is also a key bolt for anchoring plates 36 against rotational motion with respect to the drum.

The ratio shifting controls integral with the transmission assembly are as follows. In the forward-reverse unit, slider gear 19 may occupy three positions; forward drive when clutched to teeth 7' of gear 7, neutral, and reverse drive when meshed with reverse idler gear 18. Yoke 100 is integral with member 104 mounted on rod 101 and controlled through arm 102 and shaft 103. This linkage is also shown in Figures 3 and 6.

By way of illustration, in Figure 4 is shown anchored in casing 2, one end of brake element 90. Pin 92, locked by a nut 92a, engages the socket of anchor piece 91. The opposite end 93 of brake 90 is pivoted at 90a to thrust rod 190. This brake element as shown consists of a single turn wrapped so that upon actuation when the unit is operating, a minimum of self-energising force exists. Pre-set or pre-energised springs, held off by the fluid pressure system and controls to be described, are effective to actuate the brake at controlled rates. The detail of the servo system is shown in Figure 6. The brake 80 of the front unit is identically constructed, and internally arranged as in Figure 6.

Clutch 55—60 as in Figure 1a couples reaction drum 39 to shaft 21 to establish direct drive in the rear unit, and brake 90 prevents rotation of drum 39 and annulus gear 42 to establish geared drive. The clutch detail is given in Figure 5. Similarly, clutch 33—36 couples clutch drum 28 to drum 34 for direct drive in the front unit, and brake 80 attached to casing 2, and worked by piston rod 280, establishes geared drive. (See Figures 4 and 9.)

In summation, either front or rear unit may therefore be in direct or geared drive by alternate operation of the brake or clutch respectively, yielding four net forward speeds, as in the following examples:

It should be noted that shift lever 109 fastened to shaft 103 transfers operator shifter movements from the linkage at the left of Figure 6 to gear 19 of Figure 1.

| Ratio | Front unit | Rear unit |
|---|---|---|
| 1. 3.375/1 | Reduction | Reduction. |
| 2. 2.25/1 | Direct | Do. |
| 3. 1.5/1 | Reduction | Direct. |
| 4. 1/1 | Direct | Do. |

For example, with reduction ratios of 1.5 to 1 in the forward unit, and 2.25 to 1 in the rear unit, the overall lowest ratio available would be 3.375.

The next lowest ratio would be 2.25 to 1, obtained by keeping the rear unit in reduction, and shifting the front unit to direct. Now if we shift the rear unit to direct, and the front unit to geared drive, we obtain a net overall reduction of 1.5 to 1. Direct drive in both units yields 1 to 1, all elements rotating together. It is entirely feasible to obtain all of those ratios superimposed on the reverse drive gear ratio, but is unnecessary for passenger car purposes.

In Figure 6, recessed in cylinders 71 in flange 29 of drum 28 are clutch pistons 72, guided by pins 73 in presser plate 74. Similarly, cylinders 75 in web 56 of drum 39 are fitted with pistons 76 guided by pins 77 in presser plate 78. Drilled passages 79 lead to cylinders 71 and passages 79' lead to cylinders 75.

*Lubrication and servo system*

The main supply of transmission lubricating oil for all three transmission units is kept in the sump 219. The main drive for the double pump is by means of element 20 to which pump rotor gear 173 is fixed, and shaft 178. The pump is operating at all times whenever either shaft 5 or shaft 8 are running by virtue of the drive transmitted through gears 173 and 174. The construction is shown in Figures 1, 2, and 3.

Passage 221 receives lubrication oil from pump line 220 shown in Figures 9 and 12, delivering to ports 221, 223, 224, 225, and 226, from whence it is fed under pressure to the various bearings and gear elements.

Figure 2 shows the detail of the drive to the servo pump. Gear 174 fixed to shaft 8 drives gear coupling 175 in which is socketed governor shaft 241 and the secondary rotor shaft 176 of the servo pump. For all forward rotations of shaft 8, the secondary pump assembly 180 produces positive pressure, but for negative rotations, its rotation subtracts from the net line pressure produced by primary pump assembly 179.

Gear 173 affixed to countershaft body 20 drives gear 177 of hollow shaft 178, which drives the rotor 171 of primary pump unit 179.

As noted in Figure 3, the primary rotor 171 drives idler gear 182, and the secondary rotor 172 drves idler gear 183. For all rotations of the engine connected shaft 5, primary pump unit 179 furnishes positive pressure, even when shaft 8 revolves in reverse. See diagram, right, in Figure 9.

The suction space 170 of the pump feeds from pipe 191 of Figure 3 and delivers through both gear discharge orifices 184 and 185 to pressure space 195 from which the main feed is delivered to ports 202 and 204 of the automatic pressure control valve 200, shown in Figures 9 and 12.

Pump suction is exerted at space 170, and pressure is developed as long as either of the two rotors receives drive through the described gearing paths. Driving in reverse does effect slightly the positive net delivery of pressure by the pump, since the pump unit driven by gear 174 is of smaller capacity, and may rob the other unit. The outward flow of oil is best seen in Figure 9 where pressure space 195 opens to passages 196 and 197. Valve cylinder body 198 may be built into the casing 2 or separately attached. Valve member 200 moves back and forth in ported passage 199, held by spring 201 in the "down" position, as in Figure 9, and lifted by pressure furnished by the pump through milled leads 196 and 197.

The valve member 200 is a ground fit in this passage 199 to form seats between the ports which will now be enumerated; port 202 at the lower position, open to lead 196 from the pump; port 203 connected to the servo pressure main 238; port 204 to the transmission lubrication main 220; port 205 to pump port 197; and port 206 to the exhaust outlet valve 217. Stop flange 207 affords a seat for spring 201.

Valve member 200 has a longitudinal passage 208 cut part way of boss 214, which in the lowermost position is clear of the bottom of port 202, for obtaining initial pressure lift against spring 201. Assuming an increase of pressure in the pump, valve member 200 will rise as pressure builds up behind abutment 210.

As the upper edge of 208 passes the lower limit of port 203, valve member 200 has already exposed port 204, the fluid pressure from lead 197 now being delivered through port 203 to the servo pressure line. Further increase in pressure lifts 208 past port 204 whence both 204 and 203 are served by the valve member 200 in the new position.

Figure 12 shows the normal running position of the valve 200 with 205 exposed for balancing effect. A decrease in pump pressure below a minimum causes pressure above and below boss 214 to become less than the force of spring 201, and less than the brake spring pressure so that valve 200 dumps the oil from the servo line into the lubrication main 220.

At extreme operating speeds, if pump develops more than the required pressure, valve 200 will go to the extreme "up" position, with spring 201 fully compressed. At this setting, abutment 211 is opposite the upper limit of relief port 206.

Over pressure from lead 197 may escape direct to port 206, returning to the transmission sump by relief valve 217. At high speed the relief action occurs whenever the pressure requirement is exceeded, but no disconcerting change in the operator's control over the servo mechanism occurs.

Some of the advantages of this valve and porting combination are that it maintains uniform servo line pressure, yields a positive servo cutoff at a given minimum pump pressure, and protects both servo and lubrication systems against excess oil pressure. An additional feature is the utility of the leak pass 214 at low speeds for initial lubrication.

A feature in this construction is the transfer of relieved servo pressure to the lubrication system. This prevents hunting and consequent slipping of the clutches and brakes in the transmission assembly; a useful commercial feature for avoiding excessive wear and heat.

The particular grouping of the porting of the automatic pressure valve in the present combination provides a new characteristic extending the range of utility of controls provided by the valve action. The ground fitting of valve 200 in bore 199 is sufficiently loose so that a continuous leakage of pressure occurs. The graduated effect of this leakage, coupled with the restriction passage 208, the related capacities of brake and clutch cylinders, and the force of brake springs, combine to yield a net response suitable for establishing changes of speed ratio varied by pump pressure.

For example, with not sufficient pressure in line 238 to sustain clutching in the front and rear units, their brake springs lock the brakes to establish "low-low," or lowest forward driving speed ratio. Provided the other valve controls are set to deliver pressure to the front and rear unit systems, an increase of pump pressure lifts valve 200 to a point where boss 214 blocks port 204, preceding the uncovering of port 205 by abutment 211.

Spring 201 is preset to yield for a given set of pressure conditions such that when the valve 200 passes from initial to running condition, there is a rapid build-up of servo line pressure at the medium low speeds of the pump, at which capacity is ample to operate the fluid servo motors of both the front and rear units.

Therefore, if the further, ratio control valving is set to admit servo line pressure from 238 to either or both of the front and rear units, the speed ratio of drive will change up to second or to higher speed ratios, established by variations of pump pressure and controlled by automatic valve 200. In this case the settings of valves 168 and 150 may be considered as preselected, with actual selection determined by valve 200. In this event, the engine speed at which the operator determines to drive, the ability of the engine to handle the existing load, and the resulting speed of shaft 3 are the factors which control the critical pressure for speed ratio upshift.

Inlet port 266 delivers fluid pressure from line 238 and line 273 to valve 150. Relief port 268 opening to sump, may be equipped with a self-loaded relief valve such as 217 in Figures 9 and 12, for metering the rate of clutch release and brake engagement, as is obvious from the construction. Further port 269 relieves the end of valve 150, freeing the movement from suction, to afford a positive response of valve positioning to governor and operator-operated movements.

If in starting off in "low-low" the operator has set the handlever 301 in "high," valve 168 is in the upper position, and at a pump pressure for example of 50 pounds, valve 200 has admitted pressure to line 238, which pressure is now available to brake piston 291 and clutch pistons 76. In a given interval, pressure in 238 will rise until brake 90 will release, and clutch 55—60 will assume the drive at whatever pressures are existing at the end point of brake release with a clutch capacity commensurate with the brake release pressure value.

At the same time the governor operated valve 150 may be in either the right or left position, depending upon the coaction of pin 115 and lever 111, and if in the right or direct drive position, the building up of line pressure in 238 will also cause actuation of brake piston 281 and clutch pistons 72 of the front unit. It will be seen that valve 200 does, under these circumstances, afford automatic ratio upshift. If the handlever 301 were in the "low" position, valve 168 would, of course, be inactive, and change-up in ratio could only occur in the front unit, by presetting of valve 150.

Automatic downshift therefore can occur as a complement to the above described action, by movement of valve 200, the relief of pressure being controlled by two means; first, through dumping of line pressure into the lubrication line 220, and second, by reason of the metering action of check valve 218 pivoted at 219', having metering port 227, and mounted to respond to back pressure flow toward the pump from the servo motors, and to swing clear when the pump pressure is positive. As soon as pump pressure falls, the release rate of pressure from the servo system is controlled by metering port 227, while the orifice capacities of 204, and the valve space between 211 and boss 214 likewise becomes effective.

The latter expedient cushions the downshift action by letting on the brake springs 97 and 87 gradually, preventing sudden, deceleration shock loads.

The pressure at which the valve releases the servo lines is preset by adjustment of screw fitting 215 in the housing, bearing against the upper end of spring 201, which may be replaced by weaker or stronger springs as desired.

Conduit 220 connects to passage 221 in web 4 of housing 2. Oil may flow freely from 221 to annular channel 222 out in the external portion of hollow shaft 8 of gear 12. Drilled holes 223 connecting to channel 222 feed oil to the passages 224 transverse of shaft 21. Longitudinal passages in shaft 21 furnish lubricant to the gears of both the front and rear units.

Drain out of such lubricant oil under pressure finds its way back to the sump 219, the closing of the direct drive elements of the clutch relieving the accumulated oil in the drums.

The forward-reverse unit obtains oil under pressure from the passages shown. Further lubrication of the unit is by customary dip in the sump oil. The compartment construction of casing 2 makes it possible to seal the entire assembly with oil pan 231, which acts as an oil reservoir, sealing means 216 providing a tight joint at all contact points.

The use of a common sump for the gear units and the servo actuators yields advantages for low leakage losses, rapid re-circulation, and maintenace of proper capacity requirements, and provides one-fill service oil replacement. The resistance drop of the circuit of oil pressure mains is arranged so that at slow engine speeds, as at idling, fresh oil is pumped through the transmission units, available the instant the engine starts up, since the main oil pump gear 173 is constantly driven from the main clutch driven shaft 5 through gears 7—16.

To relieve the driver or servicer from learning new modes of operation, I arrange the servo mechanism so that when the car is standing still, the driver may warm up a cold engine by holding the customary main clutch pedal in disengaging position. This operation may be carried on without forcing oil unnecessarily through the servo system.

The double pump system is a feature of my invention but not claimed in the present application. Since shafts 5 and 8 may rotate at different speeds, and in opposite relative directions, and since it is desirable to furnish oil pressure at all times whenever any rotation whatever is imparted to the variable speed gearing; and further that it is advantageous to arrange the mechanism so that no operator's whim may interfere with the circulation of oil whenever the related portions of the gearing may be rotating under either engine rotation or vehicle motion, I have herein created an oil supply system fulfilling these requirements by combining the rotation of these shafts in a driving system to a double unit pump of the augmenting type, staged for one range of pressures for forward drive, and for another range of pressures for reverse drive, yet providing adequate pressures in both ranges. This form of pump, and drive system, is believed of unusual utility.

When the car is in motion, whether or not jaw clutches 7'—19 are engaged, the pump gears always supply servo and lubrication pressure. If the jaw clutches are disengaged by shift of the hand lever 301 to neutral, the pump still will be driven by the engine, until the main clutch is disengaged, and car motion will also drive pump gear 174.

It is not possible to withhold drive from the pump, at any time when either engine or vehicle are in motion.

The automatic speed ratio controls for the operation of the front unit comprise, first, 110, moved by the governor toward the left in Figures 6 and 7 as engine speed increases, and pivoted to equalizer bar 111 at 112.

The opposite end of the equalizer bar 111 is pivoted to toggle shifter rod 113 at 136, and near its center, notch 114 is engaged by pin 115 set in lost motion lever 116. The latter lever rotates on shaft 120 as a center; carries spring stop 117 and also arm 123.

Opposing spring stop 119 is integral with lever 121, also rotatable on shaft 120, and having eyelet 127. Intermediate spring 125 transmits forces in compression between levers 121 and 116, the spring stops 119 and 117 preventing the spring from leaving position.

Pin 118 in lever 136 may engage eyelet 127 of lever 121 rotatable on shaft 120, the function of the eyelet being to provide lost motion or limit it in the clockwise rotation of control shaft 120.

Adjustable stops 128 and 129 mounted in compartment 124 are used to limit the angular position of lever 121.

Lever 132 mounted external to the compartment 124, rotatable with shaft 120, is pivoted to rod 361 and 134, and responds to the accelerator pedal movement.

At a given position of governor link pivot 112, lever 132 may rotate about center 120 counterclockwise, rotating lever 131 and pin 118 causing arm 121 and spring stop 119 to compress spring 125 applying an increasing force to cause corresponding motion of 116. Pin 115 thereupon exerts a leftward force upon equalizer bar 111, and on link lever 113 attached to it at pivot 136.

An increase in governor speed will tend to shift pivot 136 to the right, lever 111 fulcruming at 114, tending to counteract the above mentioned motion.

Casing extension 165 supports levers 138—139 at pivot 137.

On fixed pivot 137 toggle arms 138 and 139 are mounted, the lower arm 138 being attached to pivot coupling 140. The engaging end of link lever 113 coacts with coupling 140 assisted by spring 141 stressed between guide lug 143 and the pin 140 on link lever 113. Thus a rightwardly exerted force in rod 113 acts on coupling 140 to cause arm 138 to swing counterclockwise about fixed pivot 137.

The upper arm 139 of the toggle is yoked to valve body 150 by loose pivot 144, and also at its upper end, carries weighted pivot 145.

Toggle spring 148 attached to arms 138 and 139 at 149 and 145 respectively, stores energy for snapping the valve right or left, as pivot 149 of arm 138 is moved past center with relationship to fixed pivot 137 and pivot 145 of arm 139.

When valve body 150 is in the right hand position as will be seen later, fluid pressure is admitted to hold off brake 80 and engage the clutch 33—36 of the front unit. When it is in the left hand position, the fluid pressure of that system is released and the front unit is put in low gear drive by springs 87—87a actuating brake band 80, through rod 280, rocker 393 and thrust rod similar to 190 in Figure 4.

Plate 126 rotating with shaft 152 is rocked by movement of externally mounted lever 151 attached to shaft 152. The latter lever is joined to rod 310 at pivot 153, and selection movement of hand lever 301 of Figure 6 acts to shift lever 151 to operator-selected positions, through 310, pivots 311 and 309, rod 308, clevis pivot 307, curved arm 306, shaft 305, and lever 301.

The interaction of follower 123' of lever 123 integral with 116 is used to prevent downshift of the front unit when the handlever 301 is in "low," cam 126 restraining clockwise motion of 123 of Figure 7. Resumption of "high" drive restores the coaction by moving cam 126 out of contact with follower 123', whereupon the latter is free and automatic shift action is resumed.

Irregular cam slot 155 cut in cam plate 126 actuates the valve 168 connected with the operation of the rear unit. Hook 156 acts as a stop engaging with toggle arm head 145 to prevent automatic shift to high ratio in the front unit, when the plate 126 is in "reverse" position. This is the automatic shift lockout mechanism.

Lever 160 pivoted at 158 moves manual valve 168 at yoke 298 and carries pin 159 which fits cam slot 155 of cam plate 126. The centers of 152 and 158 are taken with respect to the arm 158—159 and the radii of slot distances from center 152 so that movement of arm 151 by rod 310 forces lever 160 to follow clockwise motion of lever 151, actuating manual valve 168 of the rear unit, for shift to "low," or counterclockwise for "direct."

Valve 168 moved by lever 160 through yoke 298 follows the movement of lever 151. The cam slot 155 which moves pin 159 of 160 is arranged to establish the valve 168 in the following positions:

| Handshift | Valve | Pressure | Ratio |
| --- | --- | --- | --- |
| Reverse | Up | Off | Low. |
| Neutral | Down | On | High. |
| Low | Up | Off | Low. |
| High | Down | On | High. |

It will be noted that the rear unit is maintained in direct drive condition in neutral. This enables the driver of a car with a stalled engine to obtain an easy start by towing, for as soon as the shaft 8 turns over because of car motion, pump drive through gear 174 builds up pressure to shift ratio in the rear unit to direct, lessening the required towing torque.

Positioning lever 135 attached at pivot 161 to governor rod 110 is pivoted to the casing at 135'.

Servo controls

These control linkages may be mounted on the left side of the transmission casing superimposed upon the valve casting, as indicated schematically with the governor mechanism at the left; and at the right the toggle support 165 for pivot 137. The downward extension of the valve case casting terminates at the right in guide lugs 143, between which lever link 113 is constrained to move. Pivot pin 158 projects toward the eye of the observer and is a mounting for lever 160.

The manual control valve 168 moves in bore 167; uppermost port, 260, relieves fluid pressure from the cylindrical space 261, dumping the oil back into the external portion of the housing, from whence it drains back to the sump 219 of the transmission. The second port, 262, leads to the outlet of the casing, from where the oil may flow, through line 272 to the control cylinder 292 for the rear unit. The port 263 below is the inlet from the servo pump, and it receives oil from passage 273 through the porting shown. The port, 264, delivers fluid pressure to passage 277, from where it is used to compensate for brake releasing action of springs 97 and 97a. Straps 263 cover cylinders 282 and 292, as retainers for the spring assemblies shown.

When the valve 168 is in the lowermost position, the pressure from the servo is admitted to port 264 and through 276—277 to cylinder 295, thus compensating for existing line pressure in 279, for regulating the torque capacity of clutch 55—60, as will be explained. When the valve 168 is in the upper position, it cuts off the pressure from the line 262—272 and drains ports 264 and 262. This is accomplished when the hand lever 301 is placed in either "low" or "reverse" position on the indicator plate 302. During downshift from direct to low speed ratio in the rear unit, this port relationship is effective, but not when in "neutral."

When the valve 168 is at the bottom of its stroke or in the direct drive position fluid pressure from 263 is admitted to port 262, and is effective to overcome the force of springs 97—97a exerted on brake 90, as well as exert pressure upon clutch plates 55—60. Port 260 is effective to drain the rear unit cylinder 292 through port 262 when the valve 168 is moved back to the low-speed position.

Clutch feed lines 278 and 279 are shown in the schematic view of Figure 6.

Figures 6 and 8 show valve plunger 150 for the control of the front unit in closed position, with line 278 and port 267 open to exhaust. When valve 150 shifts to the right-hand position, the front unit will go to direct drive, the action causing engagement of clutch 33—36.

The mechanical movement which requires the valve to occupy the described two positions is shown in Figure 6, where loose pin 144 connects the extension of valve 150 external to the case 161 to toggle levers 139—138. The two-positional action of the toggle mechanism has been described preceding.

Piston rod 290 works against rocker 193 pivoted at 194, movement of rocker 193 exerting thrust on thrust arm 190, which is pivoted to the free end of brake band 90 at 90a, and the reduced end of which swivels in notch 192.

Rod 290 is fastened to abutment member 296, which is apertured to permit passage through it of pins 297 attached to piston 294, whereby sliding abutment 274, on fixed abutment rod 300 may receive the motion caused by fluid pressure in 295 and 292.

Attention is directed to the construction of the actuation units shown in Figure 6. Springs 87, 87a, and 87b react against retainer strap 283 bolted to cylinder 282, which may be integral with transmission case 2 or the metal forming the compartment 124. Springs 87 and 87a exert their tension against piston 281, which may slide freely on rod 280. Spring 87b normally exerts pressure against abutment member 288 raised to slide on stop rod 300 attached to cap 283. Abutment member 286 is rigidly attached to the end of rod 280, and may bear against abutment member 288 to the limit of motion allowed by the ends of rods 280 and 300.

Compensating spring 284 bears against the inner face of piston 281, seating firmly against fixed abutment 285 attached to rod 280 by a lock ring.

The normal condition of the mechanical system described preceding is to apply the pressure of the springs 87, 87a and 87b to piston 281, which at its upward limit of motion presses directly against the extended collar of abutment 285 as shown in Figure 6, loading the brake member 80 of the front unit on engagement.

Initial fluid pressure admitted through pipe 275 to cylinder 282 may build up rapidly, being assisted by the force stored in spring 284. When the face of piston 281 strikes the upper end of abutment 286 at point 286a, the two springs 87 and 87a are overcome and the initial positive movement of the brake releasing system begins. The continuing application of fluid pressure to cylinder 282 thereafter causes abutment 286 to engage abutment 288, pressing spring 87b. Continued movement may therefore take place until the shrouded end of rod 280 engages the adjacent end of fixed abutment rod 300.

Assuming that the servo pump may only deliver a finite pressure at any one time, movement of valve 150 to a position to connect the pump with port 275 likewise affects the net pressures existing in line 278, available for loading pistons 72 and establishing drive in clutch 33—36 of the front unit. It will be understood that during the first phase of pressure increase in cylinder 282, that the first stage of pressure during which spring 284 is loading piston 281 to move toward point 286a is the initial engagement stage of the clutch, during which a fairly rapid building up of volume is accompanied by a gentle rise in pressure in clutch cylinders 71. After the abutments 286 and 288 meet, the increase in pressure due to the increased resistance of spring 87b now brought into play causes a more sudden building up of pressure on the clutch plates 33—36, so that a graduated and increasing clutch capacity can be created and sustained during the clutch engaging cycle when the brake release mechanism is operative, and thereafter when the relative motion between the sets of clutch plates ceases.

Port 262 connects pump line 273 and its port 263 with line 279 when valve 168 is in the "up" position of Figure 9. Port 260 opens to sump through self-loaded valve (not numbered) affixed to the casing of compartment 124. Port 264 joins the lead 276 to compensator line 277 of the rear unit, corresponding to port 267, which joins 276 to compensator line 277' for the front unit.

In Figure 9 cam plate 126', similar to 126 of Figure 6, is mounted to rotate freely on shaft 120, and is moved by lever 415 attached to the shaft, through spring 416 and lever 417 pivoted on the cam plate 126' at 418. Stop pins (not numbered) retain proper distance relationships between levers 415 and 417, which are bossed to hold the ends of spring 416 in place.

Lever 135', moved by the governor, is arranged to transmit its motion to lever 420 which, in construction, may be integral with, or an extension of 135', although in the schematic drawings, the two levers are shown separate, joined by a shaft pivoted on the housing. When the governor mechanism goes to high speed position, levers 135' and 420 rock counterclockwise until the flat end of 420 assumes a position to block clockwise movement of lever 217. Should the operator attempt to shift the rear unit to low by movement of lever 301 of Figure 6, at a time when governor speed is upward of 70 miles per hour, for example, lever 420 will abut lever 417, and the cam plate 126' will not move, although the handlever action will yield to the operator's effort because of spring 416.

Lost motion lever 116' of Figure 9 is pivoted in the compartment 124 to swing in an arc to intersect the movement of lever 131' rocking with shaft 120 and lever 132 connected as in Figure 6, to the accelerator pedal 303. Fluid pressure from 272 and 279 is led through line 410 to apertured bushing 411 and through line 412 cored and drilled in lever 116'.

Piston 413 receives fluid pressure from this system, line 412 opening to cylinder 414 in which piston 413 is mounted, so that whenever the rear unit is in direct drive, the clearance distance between the end of lever 131' and the base of piston 413 becomes less, and the net distance moved by the pedal connected lever 131' is less, before a resulting response of lever 116' to pedal motion is had.

The passage of clutch fluid pressure from cylinder 282 of the front unit flows through 278, and 79 to cylinders 71 in drum 28. Likewise the flow from cylinder 292 of the rear unit passes through 272, 279, and 79' to cylinders 75 of drum 39.

Figure 4 is a transverse vertical section through the transmission assembly. Drum 39 of the rear unit is shown in position to be gripped by brake band 90, the fixed end of which, 91, is restrained from clockwise movement by adjustable bolt 92 through the extension of housing 2. The movable end 93 of band 90 is positioned by thrust rod 190, rocker 193 and the upper end of piston rod 290, which is attached to piston 291 fitting into cylindrical recess 292 in the housing as in Figure 6. Springs 97 and 97a bear against the piston 291 in a direction to cause brake band 90 to grip drum 39 being supported by base or cap 293. Subpiston 294 slides in compensating cylinder 295 under fluid pressure supplied from the differential valve 320 described following. The three conditions of operation of this structure are: first, fluid pressure may be introduced against the head of piston 291 to counteract the force of springs 97 and 97a and thereby release brake band 90 from drum 39; second, fluid pressure admitted to subpiston cylinder 295 may change the value of the line pressure at the moment when brake release occurs; and third, the fluid pressure may work simultaneously behind both pistons 291 and 294, providing a low line pressure at the instant of brake release, which acts to limit the clutch capacity since the degree of line pressure governs the magnitude of clutch loading.

The latter expedient is to eliminate shock during ratio downshift at light engine torques, and to proportionalize torque capacity to torque demand. This effect is made possible by the nature of the clutch construction described above in connection with Fig. 5, since the provision of inherent rate control of variable clutch area with loading pressure, coupled with rapid release of torque when the clutch is unloaded both have time factors capable of coacting with the above control structure for attaining optimum engaging and release action.

The differential valve mechanism is housed in the casing 2 behind the compartment 124, and consists of valve 320 integral with stem 321, pressed toward its seat by spring 322 and plunger 323, the spring and plunger force being opposed by fluid pressure, as will be described further.

As shown in Figure 8, the valve 320 is mounted to slide freely in bore 319, the extension 324 striking stop 325 at the upper limit of motion. The upper end of bore 319 is enlarged to accommodate ported sleeve 326, which may slide therein. Flange 327 of sleeve 326 is pressed toward seating with the upper edge of valve 320, by spring 328 whose retainer cap 329 fastened on the valve casing is of such inner diameter as to limit the upward travel of sleeve 326, which latter is a form of piston valve.

Annular recess 330 forms a lifter port for sleeve 326, whereby fluid pressure from line 318 may oppose the pressure of spring 328, and change the port opening between the lower edge of the sleeve 326 and the upper face of valve 320.

Transverse ports 331 in sleeve 326 coincide generally with large annular space 332 connecting to drilled passage 262, wherein fluid pressure from 262 may always be open to space 333, between stop 325, the interior of sleeve 326 and the upper face of valve 320.

Annular outlet space 334 is of smaller diameter than sleeve 326, thus providing a limit of downward travel therefor. Space 334 is ported at 335 and 336, the passage 337 leading to counterbalancing annulus 338; and the passage 276 being connected to the compensator chamber 295 of the actuator for the rear unit.

Spaced between annuli 334 and 338 is the exhaust annulus 339, for relieving excess pressure from space 338. Cap 329 may be of threaded form with relationship to casing 2, for variable adjustment of the tension on spring 328, in order to predetermine that pressure in line 318 at which sleeve 326 will rise, and thereby establish the clearance distance between sleeve 326 and valve 320 for closing off space 334, when valve 320 is moved by plunger 323.

The net tension in spring 322 determined by normal setting of lever 122 against plunger 323 and the degree of line pressure in space 334 from lead 254, establishes the gradation characteristic in the building up of compensation action by piston 296 in the control of line pressure in 279 and clutch cylinders 75, as will be explained in the discussion following, descriptive of the clutch capacity control.

The construction of the brake bands 80 and 90 is identical.

The front unit parts in the brake actuation assembly are identical with those of the rear unit, rocker 393 being the same as rocker 193, the remaining thrust rod and notch construction, likewise the same. Wherever possible, identifying numbers in series pertain to similar parts having identical functions. It is not deemed necessary to show a full section of the brake actuation mechanism of the front unit, because of the parallel identity of the parts.

The bracket 304 is shown attached to the steering column in Figure 6, forming a bearing for shaft 305 and a mount for sector indicator plate 302. Handlever 301 attached to shaft 305 swings in an arc over positions corresponding to "high," "low," "neutral" and "reverse" respectively, as marked in abbreviations on the sector plate 302 of H. L. N. R.

Button 316 is a spring-loaded latch, hand operated, to hold lever 301 in any of its operation-determining positions.

Reciprocating motion of the lever results in corresponding reciprocation of the shifter rod 308, pivots 309, 311 of lever 109, rod 310, and pivot 153 of lever 151 as seen in Figures 6 and 7.

The transverse section of Figures 2 and 3 shows the governor drive mechanism, the gear 175 fixed to shaft 241 meshing with gear 174 of shaft 8.

The governor shaft 241 is supported in casing bearings, and carries affixed hub 244. Secured to flanged hub 244 are pins 245, each recessed under the head at 246, to engage spring retainer plate 247. Weight arms 248 are pivoted to hub 244 at 249 and terminate in cam ends 260 and weight ends 251.

External large coil spring 252 rests against plate 247 and fits a recessed seat in the flange of hub 244. Internal coil spring 254 likewise rests against retainer plate 247 and presses traveler sleeve 255 to the left. This sleeve 255 is hollowed out to a bearing fit over the spindle end 256 of shaft 241 and may slide freely axially, as thrust by the end of spring 254 acting on flange 259.

At the external end of sleeve 255 collar 257 provides connecting means for the external mechanism to be moved by the governor, as indicated in Figure 6. Normally at rest, the assembly of governor parts is as shown in Figure 6. As applied speed increases, weights 251 of arms 248 swing about pivots 249 and cam ends 260 shift sleeve 255 against the tension of spring 254. When the sleeve has moved a predetermined distance, the seat 233 of the flange 259 of sleeve 255 abuts end of spring 252, and further increase of applied speed results in weights working against the combined stresses of springs 254 and 252. It will be seen that the relative travel of sleeve 255 for a given speed increment in the latter phase is less than in the prior stage, the governor working against an increased resistance. Variations of governor speed above a predetermined point can create no change in the external control mechanism, when the weights 251 stand at wider angles to the center line of the shaft 241.

The collar 257 is arranged to move arm 350 fixed to shaft 351 of Figure 6, which latter moves arm 352 pivoted to governor rod 110 at 353. In this way axial motion of sleeve 255 is converted to reciprocating motion of governor rod 110, pivot 112 and rocking of equalizer bar 111 is accomplished.

The relationship of the accelerator pedal and handlever linkage are shown in Figure 6.

Accelerator pedal 303 is pivoted on the floorboard of the driver's compartment, and rod 355 is pivoted at 356 so as to be moved freely by the pedal 303. Return spring 357 serves to restore the pedal to minimum throttle position. Connection 363 is to the engine throttle.

The bracket shown provides a pivot for shaft 358 and lever 359, the rod 355 hooking into hole 360, and lever 364 being attached to the shaft 358, and pivoted to rod 361 at 362. Depression of the accelerator pedal 303 will therefore exert a thrust on rod 355, lever 359 will swing clockwise, and consequently rod 361 will be pulled toward the left in Figure 6. This action rocks lever 132 through fitted pivot 134, and shaft center 120, causing pin 118 to engage eyelet 127, and rock lever 121 counterclockwise. Whenever spring 125 is so stressed, the impulse of the driver's foot is exerted to swing lever 116 in the same direction, consequently tending to move pin 115 and bar 111 to the left. This is the direction of movement to pull rod 113 to the left, which may through the toggle mechanism 138—139 snap the valve 150 controlling the front unit into the "low" position. Whenever the accelerator pedal 303 is depressed, the described mechanism then establishes a tendency for valve 150 to "downshift."

The engine carburetor is not shown, as this is believed unnecessary.

In Figure 6, the engine accelerator pedal 303 rocks shaft 358 through rod 355 and lever 359, the shaft 358 being fixed to lever 359' pivoted to rod 363 to open and close the engine throttle (not shown). Lever 364 fixed to shaft 358 is pivoted to rod 361, in turn pivoted to lever 132 of the ratio control apparatus. Spring 357 retracts the throttle pedal connected system.

The following assembly of parts are mounted on the transmission casing 2. Shaft 120, to which lever 132 is attached extends into the control compartment 124, where lever 131 is attached to the shaft. Levers 116 and 121 may rotate on 120. Lever 131 carries pin 118 which fits loosely in eyelet 127 of lever 121, and carries extension arm 123, with cam follower 123'.

An adjustment placed at pivot 362 permits the service operator to set the relationship between required motion of the pedal 303 for a given effect on the mechanism controlled by rod 361, and that at 359'—363 may be set to determine the movement of the engine throttle, so that a predetermined throttle pedal position provides a given stress of spring 125 followed by engagement of abutments 119 and 117 of the levers 121 and 116 to suit the engine torque-speed curve and the running resistance of the vehicle. The adjustments may be set so as to require any predetermined throttle opening before downshift occurs, and the adjustable stop system 128—129 enables the service operator to vary the relative effect of the throttle motion upon the shift control.

In Figure 13 is shown a modification of the control structure of Figures 6 and 7, wherein camplate 126" is arranged to occupy a position beyond the "high" for enabling the car driver to enforce a downshift in the front unit within predetermined operating speed ranges. Slot 155' in camplate 126" is extended to a new position such that it may rotate counterclockwise between "H" and "3rd" without moving pin 159' of arm 160 and therefore allow the rear unit valve 168 controlled by that arm to remain in the upper position of feeding fluid pressure to the rear unit.

Extension 130 of camplate 126" rotates so as to intersect pin 115 of lever 123, over the rounded surface of which it may exert a camming action, shifting the pin 115 to the left, causing equalizer bar 111 to move to the left an equivalent distance to that caused by wide open throttle through the connections of lever 131, pin 118, eyelet 127, lever 121, spring 125 and lever 116 to which pin 115 is attached, as in Figures 6 and 7.

The structure enables the operator to establish a manually enforced downshift to 3rd speed, which may be maintained indefinitely for driving in gradients, with engine braking, and is also useful for acceleration demand other than provided by throttle pedal interaction control with the governor mechanism.

At speeds above 65 miles per hour, for example, the governor may move pivot 112 so far to the left that this enforced downshift action cannot occur, and the drive will then remain in direct in both units, with both clutches retaining their effective driving torque capacity.

The modification in the manual controls required to accommodate for the extra motion of the enforced third shift is shown in Figure 14, wherein sector plate 302 is extended to a new position marked "Third." The movement of the hand lever 301 from "H" to the new position in no way affects the action of the valve 168 controlling the rear unit, since slot 155' of even radius with that of the slot 155 to the point where fluid pressure admission to the rear unit is established.

Controls similar to the above have been described and discussed in the preceding cases noted in the superscription of the present specification.

The governor connected linkage has not, however, been put out of action, but is still able to prevent abuse of engine and transmission, in that at an extreme high speed governor position, corresponding to a predetermined car speed of say, 63 miles per hour, point 112 can move far enough to the left to shift the valve 150 back to "High," or direct drive in the automatic unit.

This yields a selective effect of engine braking and acceleration available to the car driver within definite speed ranges of engine and vehicle, wherein neither engine nor transmission mechanism may be abused, and permits the driver to establish a fixed reduction ratio for gradient work where torque rather than fuel economy is desired.

It will be noted that after an excess speed upshift to "High" compelled by the governor, when the setting is for enforced "Third" drive; the control mechanism will reset to "Third" when the governor speed falls, and drive in "Third" will be resumed, requiring no especial attention from the car driver. Resumption of normal automatic shift in the automatic unit is accomplished by resetting the handlever 301 in its "High" position.

The motion of the handlever 301 from "Low" position to other sector required a lost motion provision in the linkage of lever 308 to shaft 103, lever 102, and slider 104, so that after jaw clutches 7'—19 are meshed, the motion of 301 may be continued. Roller 312 after completing the stroke of slider 104 toward mesh of 7'—19, may ride free of cam face 105 of the slider, so that the lost motion provision is herein accounted for. This feature combines the two motions of rocking of 102 and the sliding of 104 on rod 101.

In Figure 9, manual valve 168 is in the "up" position whence pump line pressure from 273 may flow to 272, and thence to brake piston 291 and clutch pistons 76 through the described portings. The valve is shown in the "down" position in Figure 10, port 263 from the pump line 273 being cut off, and line 272 being opened to exhaust passage 260, and regulating valve attached at 260' to the casing. Valve 260" is made of spring steel, of a predetermined rate characteristic, such that its exposed area bears a calculated relationship, for the purpose of controlling the released pressure flow, thereby regulating the rates of clutch release, and brake application in the rear unit.

Figure 11 is an enlarged view of the construction of the plunger 323 operated by throttle connected lever 122, for manipulating the differential valve 320. Abutment member 274 in Figure 9 works against spring 97c under thrust from pin 297, similarly to the action of spring 97c in Figure 6.

The external shell of plunger 323 is bored out internally to fit collar washer 327 which may slide on the adjacent end of the stem 321 of valve 320. Lock ring 340 prevents the washer 327 from further movement induced by tension in spring 322.

The first increment of accelerator pedal motion rocks lever 122 counterclockwise, further compressing spring 322, opposing the force of fluid pressure acting on the upper face of valve 320, resulting in a graduating of the orifice between the lower lip of sleeve 326 and the valve 320, thereby restricting the pressure flow from space 334 to outlets 276—277 available to create pressure on counter piston 294 in the cylinder space between abutment or wall 295 in cylinder 282.

At full pedal, the end of stem 321 meets the inner end wall of plunger 323, and positive closure of the flow from space 334 to the piston 284.

In Figure 15, the porting and passages correspond to those of Figure 9, the uppermost port 318' connecting the head of stem 314' to the pressure line 278 of the front unit. The ported passage 364' connects to the mating 238, receiving net pump output pressure. Ported space 335' is joined by lead 276' to compensator lines 277 and 277', and is cross-connected to space 338' by passage 337'. Spring 322' reacts between the lower face of valve 320', and the recessed portion of plunger 323', guided by stem 321' of the the valve.

The compensator valve 320 serves the purpose of regulating the rate of transfer of torque from the geared path of torque to the clutch coupled path. It governs the degree of loading pressure on the clutch that is taking the drive, at the instant of brake release, as will be apparent from the foregoing description.

In starting, the engine idles at a given speed. With the handlever 301 in neutral position, the spinning clutch disc and drive gearing are separated from the final drive. The operator may warm up the engine, the servo pump gear circulating the transmission case oil through the described passages.

When it is desired to put the vehicle in motion, the customary clutch pedal, depressed by the foot, separates the mating clutch plates, the operator shifts the handlever 301 to correspond to "neutral to low" shift of plate 126 of Figure 6. At this point attention is directed to a valuable adjunct for absorbing the inertia of the main clutch driven plate and connected parts. In my construction, the arrangement of clutch driven shaft 5, gears 7 and 16, and servo pump, and automatic pressure valve 200, provides a predetermined back pressure when drive is removed from this system by opening of the main clutch.

Spring 201 causes valve 200 to block the flow of the pump, yet permitting oil to flow to the transmission bearings. The reactive pressure is here used as a clutch brake to assist the synchronization requirements, to give a smooth transition from neutral to "low," so that jaw clutch 7' will reduce quickly to zero speed.

Assuming forward drive synchronized, as soon as the driver relaxes the main clutch pedal, engine torque is delivered to shaft 8, and to the input annulus gear 12 of the front unit. The car load is assumed to be acting on carrier element 22 connected to shaft 21 which is the output shaft of the front unit.

With load on carrier 22, and engine torque on gear 12, a force is applied to the sun gear 25 tending to give it a retrograde rotation.

Brake band 80 of the front unit being normally stressed for locking by the springs 87, is prevented from slipping and the retrograde motion is stopped as torque reaction begins.

Gear 25 cannot further rotate, and cage 22 moves in the same direction as the engine connected gear, the planets 24 moving orbitally and rotationally, shaft 21 being driven at a ratio to engine speed, forwardly.

With springs 97 active to load band 90 of the rear unit for locking, the application of engine torque to shaft 21 and load to output shaft 50 gives rotation to shaft 50, which then applies torque to the final drive mechanism such as road wheels, tractor treads, air or ship propellers and the like; at low speed ratio, or reduction in both the front and rear units.

Overrunning torque when the throttle is relaxed, or when the load is driving the engine as on downgrades, is overcome by the greater torque reaction sustaining force of the brake springs, therefore drag is prevented.

The application of compensating fluid pressure to subpiston 284 of Figure 6, with the handlever 301 controlling valve 168 through the linkage shown, is such that ports 263 and 264 are connected whenever the handlever 301 is placed in the "low" forward position. The sub-piston also serves an additional purpose.

A similar sub-piston 285' is used to compensate for the action of the front unit brake 80, as will be described further.

Overrunning torque is then prevented from skidding the brakes because of the excess loading capacity of springs 97 and 87. The car operator is then free from any possibility of coasting or freewheeling, and my method increases the factor of positive control under severe operating conditions, therefore increasing safety. Engine braking in low gear is desirable from the point of view of maneuverability in traffic, since a more accurate control over the slow speed positioning of the vehicle is subject directly to accelerator pedal 303.

The idling gears are protected from racing during the forward driving speed change interval, since a predetermined value of torque is always being delivered through brakes 80—90 or clutches 33—36; 55—60 because of the time factors of the clutch-brake system and the overlapping control action.

The driver may now drive at will with "low" setting of lever 301 and still obtain the advantages of automatic operation. Governor 251—255 through connections 350, 351, 352 and 110 may exert an influence on the ratio control mechanism of Figure 6. Here the equalizer bar 111, on increasing governor speeds is urged to move left and to swing counterclockwise about 115 as a fulcrum, lever 135 restricting the movement. At a given governor speed, equivalent to engine speed, the pivot point 112 of bar 111 shifts left, lever link 113 shifts right, and the toggle 138—139 snaps from left to right bias, causing valve 150 to move to a position to connect ports 266 and 267. This delivers fluid pressure from main outlet 238 of the servo pump and automatic pressure valve system of Figure 12, to the head of piston 281 in cylinder 282 of the front unit, and to passages 278 and 79 leading to pistons 72 in cylinders 71 of this unit.

Piston 281 overcomes the pressure of spring 87, strikes abutment 286a of rod 280, and disengages brake 80. Pistons 72 load presser plate 74 and press the clutch discs 33—36 together, squeezing the clutch disengaging springs 88. The above described building up of torque capacity in the clutch prevents shock during this transition.

The transition from low to direct in the front unit has been made, and the new ratio of drive is the reduction ratio of the rear unit only.

For conditions requiring acceleration, maneuvering, or unusual torque demand, the handlever may be kept in the "low" position indefinitely and the mechanism will select upshift only in the front unit, depending on governor speed and throttle pedal position, the latter providing means to affect selection through the linkage 303, 355, 359, 364, and 361 of Figure 6, and through lever 132, pin 118, arm 121 and spring 125, which latter forces lever 116 and pin 115 to the most leftward position allowed by pin 118 bearing against the notch of lever 121.

This interaction is so arranged that for normal operation while in "low" setting of handlever 301, the movement of pin 115 to maximum allowed left position can force the automatic shift to "low" within the low speed ranges of the governor only, which is a protection against unnecessary, long-continued operation in the extreme low ratio gearing.

Furthermore, the cam plate 126 so limits counterclockwise motion of lever 123 about shaft 120, that as soon as the front unit shifts by governor action to direct drive, the increase in governor speed resulting from the opened throttle carries pivot 112 to the left so far that the permitted maximum leftward movement of 115 is not far enough for the driver, even by full depression of the accelerator pedal 303 to further enforce a downshift in the front unit.

Now if severe driving conditions or up-grades be met, the governor speeds may be reduced far enough so that the mechanism will be urged toward downshift.

This speed range of control is governor managed up to approximately 12 miles per hour, in which range it is not obedient to operator will to shift to a higher ratio.

One may determine this speed range by varying the strengths and adjustment of governor springs 252—254, spring 125, biasing spring 141 and toggle spring 148 of Figure 8 and the setting of the effective lengths of the various rods, and lever linkages. At descending governor speeds above car speeds of 8 miles per hour, this setting normally requires the front unit to remain in direct drive, under normal operating conditions, although the requirements vary for different vehicles, purposes, engine speed and power available, and the like.

Having considered the automatic operation in one ratio range, the operation in the second range as noted preceding will now be described.

The car operator in shifting the handlever 301 to "high" position, may fulfill one of the stated objectives, which is to cause a nearly simultaneous but actually sequential shift in both the front and rear units, so as to provide a smooth transition from one intermediate ratio to an adjacent intermediate ratio.

After the arm 123 departs from the cam face of cam plate 126, when the handlever 301 is put in "high" position, the lever 116 being urged counterclockwise by spring 125 is not further restrained, and for given governor and throttle settings, may cause the valve 150 to be moved to "low" position, approximately at the same time as the valve 168 is shifted to its "high" position. This is true, however, within a limited established governor range, and at or nearly full throttle pedal position of 303.

At increased governor speeds with relaxed throttle, there is no need for the mechanical advantage of the extra reduction speed interval of 3rd, and this downshift will not occur in the front unit, when the handlever 301 is moved from "low" to "high," so that considering overall ratios, the operator may skip 3rd speed, and shift from 2nd to direct; that is, the valve 168 only will move.

The car operator after shifting to handlever position marked "H" enters the new regime of control. With the handlever 301 in "high," the alternation of direct and reduction drive is at the control of the combined effect of governor speed and throttle position all the way up to a governor speed corresponding, for example, to 59 miles per hour, beyond which the effect of the throttle pedal 303 can no longer enforce a shift to 3rd, or to reduction in the front unit.

Full depression of the accelerator pedal 303 when driving at below 59 miles per hour causes the arm 116 to move left using pivot 112 as a momentary fulcrum, and move link lever 113 left, snapping toggle 138—139 left, and shifting valve 150 left, closing port 266 and opening ports 268—269 connecting port 267 to the sump. This drains clutch cylinders 71, line 278, cylinder 282 and line 274; springs 87 applying brake 80 to drum 28; eventually stopping the rotation of the drum, and sungear 25 which serves as the reaction element for the gearing of the front unit, establishing thereupon the reduction drive. The foregoing described quick release of the clutch at this point obviates undesired plate drag or stumbling effects.

At all governor speeds above 59 miles per hour, the pivot point 112 is moved too far left for the pin 115 to further enforce a downshift, since lever 116 is receiving the maximum effort deliverable by spring 125; the lever system 121—116 being prevented from further clockwise rotation by stop 128.

When the speed drifts below the given 59 miles per hour point, the ability of pin 115 to enforce a downshift is resumed, as will be understood from the foregoing description.

On severe up-grades which impose a heavy torque on the engine, registered as a decrease in governor speed, and with open throttle recording the operator's torque demand, the downshift will occur within a definite speed range such that smooth transition from direct to reduction in the front unit occurs, and such that the available torque is in general proportional to the torque demand. On level roads, the relative points of pivots 112 and 115 as mutually acting fulcra will therefore determine a different response characteristic by the engine's power to sustain a given speed for the existing load, conditioned by the accelerator pedal position. On downgrades, with relaxed throttle, the governor action causes the front unit to go to direct drive and remain there over all driving speed ranges above a predetermined and selected point of approximately 17 miles per hour. In the range of 17-59 miles an hour it is possible for the car driver to establish a downshift through acceleration demand set up by depressing the accelerator pedal 303, or torque demand.

While it is useful for the governor mechanism to prevent a downshift in the front unit above a predetermined speed of 59 miles per hour, for example, it is just as useful to apply a similar safeguard to the rear unit. The construction of Figure 9 shows arm 135 pivoted at 161 to the governor operated rod 110, and to lever 420 fixed to shaft 135'. Lever 420 is arranged to intersect lever 417 pivoted on pin 418 of cam plate 126, so that for governor speeds in excess of a predetermined speed, for example, 40 miles per hour, a shift of handlever 301 to "low" will not move valve 168, but compress spring 416 through lever 415.

While the handlever itself may be moved, the resistance of spring 416 is felt against the hand, and the lever 415 will move clockwise, stressing that spring without moving the valve 168, or the cam plate 126.

The reaction of governor springs 252 and 254 in the system comprising sleeve 255, collar 257, arm 350, shaft 351, arm 352, rod 110, and notch of lever 111 provides a yieldable system between weights 251, and the control parts moved by accelerator pedal 303 and handlever 301. Any governor force transmitted back through the control linkage to the accelerator pedal 303, must pass through spring 125, therefore the operator can only feel that force up to the limit of the inherent compression force of the spring.

The travel of lever 132 of Figure 7 with respect to lever 123 from idling engine throttle position to the point where pin 118 begins to cause 121 to rock provides a range of exclusive engine throttle control for pedal 303 which may be adjusted to the power requirements, and guarantees sufficient torque development before the automatic control interaction can be initiated. Beyond this point, the range of pedal movement is always involved with change of ratio except for the described checks and stops.

The driver may shift the cam plate 126 from "high" to "low" position at any time, except when the governor is at high speed positions as noted above. When this is done, valve 168 of the rear unit is moved down as in Figure 6, connecting ports 263 and 264, and venting port 261, line 272, cylinder 292, line 279, and cylinders 75 of the rear unit. When the pedal is depressed, the lever 131 is rotated until pin 118 forces arm 121 to move counterclockwise against spring 125, causing pin 115 to take a position toward the left as in Figure 7, establishing a coupled relationship between pin 115 and notch 114, limiting the leftward point where the governor forces might exert an influence for upshift. When the handlever 301 is placed in the neutral position, the gear 19 and teeth 19' slide to a non-driving point, and valve 168 moves to direct drive position for the rear unit.

Upon shifting to reverse, the main clutch pedal is depressed, applying the reactive fluid pressure load of the pump and lubrication system as previously described, to absorb the inertias of the rotating parts, and gear 19 is moved along helical splines 9 from right to left as in Figure 1.

The slider 104 through cam 312 on arm 102 traverses along rod 101 fixed to the casing, and the arm 100 moves gear 19 from right to left into mesh with idler gear 18. In shifting from reverse to neutral, the sliding gear 19 is demeshed from 18.

For ordinary passenger car work it is desired that drive in reverse shall be at only one reduction speed, whereas in various draft gear, logging engines, military tanks, excavators and the like it may be useful to arrange the transmission and controls so that the same range of variable speed ratios are available in forward and reverse drive, while the present application relates particularly to passenger vehicles in the examples. Therefore I show means to prevent the automatic shift from taking place when the handlever 301 is put in "reverse," and drive can only be in reverse at low ratios in both units.

When cam plate 126 is in "reverse" position, hook 156, of Fig. 7 swings to prevent arm 139 of Fig. 8 and pivot 145 from moving to the right, preventing valve 150 from being moved to the right to direct drive position for the front unit. The governor and throttle linkage cannot now operate toggle 138—139 with valve 150 locked in "low" position. As soon as the handlever is moved from "reverse," hook 156 no longer restrains arm 139.

If an automatic ratio increase is desired for reverse, finger 156 may be omitted, and at a given governor speed, the front unit will change from low to direct drive. During reverse shift, the cam plate 126 through slot 155 guides pin 159 of lever 157 to rock lever 169 and valve 168 to its limit of clockwise travel, lifting valve 168 so that servo pressure from line 238 through port 263 cannot flow to port 262, so that the springs 97 are active to lock brake 80 of the rear unit.

The scope of my invention is believed to be broader than the specific examples of application described herein, since many of the details may be modified in many ways within the skill of one versed in the art.

The utility of my invention is in no way circumscribed to the demonstration herewith given, i. e., an automobile power control device, but its applicability to excavators, hoists, tractors and similar machines, machine tool drive, power shafting of boats, rail cars, and aeronautical vehicles is expressly stated herewith. The scope of my invention will be apparent in the statements of the appended claims.

I claim:

1. In power clutch mechanism for vehicles, in combination, a primary clutch member composed of multiple plates, a secondary clutch member composed of multiple plates interleaved with the plates of said first named member, the plates of said primary member being uniformly channeled on both faces, the plates of said secondary member being pretensioned in conoidal shape, unloading means arranged to exert axial force to separate said members, and loading means adapted to overcome said unloading means while supplying graduated loading force.

2. In power clutch mechanism for motor vehicles, in combination, a primary clutch member composed of multiple plates, a secondary clutch member composed of multiple plates interleaved with the plates of said first named member, said first named plates being provided with channeled spaces on the engaging faces, the plates of said secondary member being pretensioned in discoidal shape, unloading means arranged to exert axial force to separate said members, and loading means adapted to overcome said unloading means while supplying graduated loading force.

3. In clutching devices for motor vehicle transmissions, in combination, driving and driven members, a clutch plate comprising a disc having two driving faces, slots in said disc arranged to cause said plate to rotate with one of the members, grooving in both faces of said disc described from its center, a second clutch plate adapted to rotate with the other of said members comprising a disc mating with said first named disc having two faces, one of which is adapted to engage one of the faces of said first named plate, said disc being pre-tensioned in conoidal form, means to lubricate the engaging faces of said plates, and loading means controlling the drive of said plates operative to flatten the disc of said second named clutch plate whereby lubricant is squeezed out of the space between the engaging faces into said grooving.

4. In transmission drive apparatus for motor vehicles, in combination, a disc clutch comprising two forms of torque sustaining elements, the first of which consists of a grooved disc, the second of which consists of a conoidal disc mating therewith, unloading means tending to disengage said elements, and loading means arranged to flatten said conoidal disc into full contact with said grooved disc through predetermined graduation of applied pressure by said loading means.

5. In transmission clutching mechanisms, in combination, driving and driven members, interleaved sets of clutch plates each mounted to rotate with one of said members to form a clutch, engaging means for said clutch, mechanical means including an arrangement in which one of said sets has its plates formed as conoidal springs and is adapted to increase the effective area of contact of said plates when said engaging means is active, and actuation means operative upon said mechanical means arranged to provide initial and final loading pressures between predetermined operating pressures by which said plates transmit drive between said members.

6. In clutches for transmission mechanisms, in the combination set forth in claim 4, the sub-combination of multiple interleaved grooved and conoidal discs, the latter of which are pre-stressed to conoidal form for acting as self-springs to resist the said loading means.

7. In the combination set forth in claim 5, the sub-combination of the other of said sets being composed of flat grooved plates mating with the first said set composed of plates pre-formed conoidally to act as self-springs.

8. In the combination described in claim 2, the sub-combination of means causing the first named plates to rotate fixedly with the said primary clutch member consisting of spline teeth located radially within the said channeled spaces and of mating teeth on said member; and of means causing the second named plates to rotate fixedly with said secondary clutch member, consisting of radial slots external radially to the discoidal faces of said second named plates engaging through-bolts affixed to said secondary clutch member.

9. In power transmission clutching devices, driving and driven members each provided with a set of clutch discs interleaved to form an engageable and disengageable clutch; the combination of one of said sets being composed of plates pretensioned in conoidal shape and the other of said sets being composed of substantially flat plates provided with channeled spaces on the engaging faces thereof, means for applying engaging pressure to and relieving said pressure from said plates, means to furnish lubricant to the faces of said plates, and operating means effective upon said first named means for actuating same such that the application of clutch engaging force first expresses excess lubricant from between the said plates followed by radial enlargement of the contact area of said plates which traps a predetermined volume of lubricant in said spaces, and such that upon removal of the said clutch engaging force the said lubricant is progressively released by radial shrinkage of the said contact area.

EARL A. THOMPSON.